(No Model.)

W. L. HAWES.
FIFTH WHEEL.

No. 575,112. Patented Jan. 12, 1897.

WITNESSES

INVENTOR
William L. Hawes
by his Attorneys
W. Bakewell & Sons

UNITED STATES PATENT OFFICE.

WILLIAM L. HAWES, OF CINCINNATI, OHIO.

FIFTH-WHEEL.

SPECIFICATION forming part of Letters Patent No. 575,112, dated January 12, 1897.

Application filed October 3, 1894. Serial No. 524,795. (No model.)

*To all whom it may concern:*

Be it known that I, WILLIAM L. HAWES, of Cincinnati, in the county of Hamilton and State of Ohio, have invented a new and useful Improvement in Fifth-Wheels, of which the following is a full, clear, and exact description, reference being had to the accompanying drawings, forming part of this specification, in which—

Figure 1:
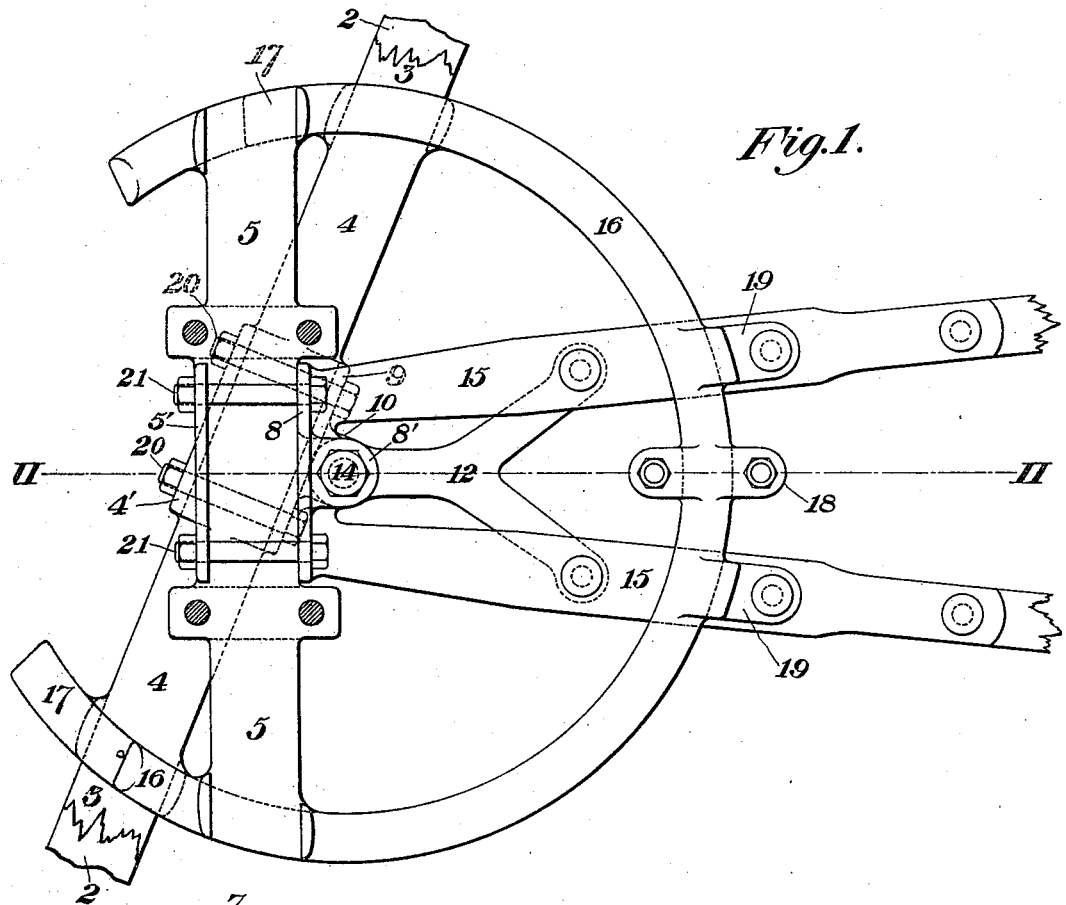
Figure 2:
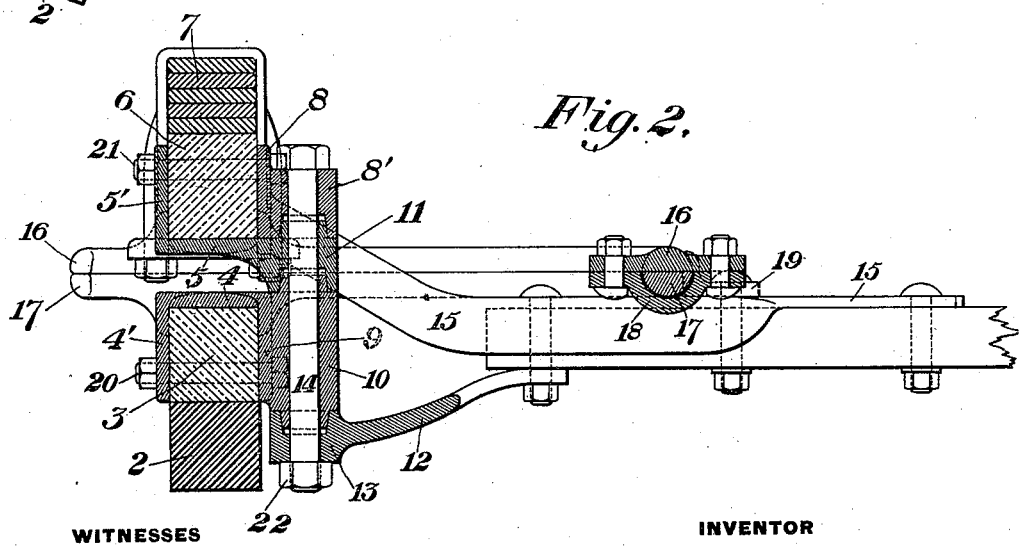

Figure 1 is a top plan view of my improved fifth-wheel. Fig. 2 is a section on the line II II of Fig. 1.

My invention relates to the "Hawes" type of fifth-wheels and is designed to strengthen and improve the construction of such wheels.

In the drawings, 2 represents the axle; 3, the axle-bed; 4, the top axle-plate, having a downwardly-extending front flange 4'; 5, the head-block plate, which is applied to the bottom of the head-block and is provided with an upwardly-projecting front flange 5'. 6 is the head-block. 7 is a spring thereon. 8' is a king-bolt socket having a flange 8, which is fixed to the rear side of the head-block. 9 is a flange which is fixed to the rear side of the axle. 10 is a king-bolt socket, which is made integral with the axle-plate 4 and extends downwardly at the rear of the axle. 11 is a socket for the king-bolt, which is integral with the head-block plate 5 and interfits with the king-bolt socket 10 in line therewith, as shown. 12 is a guard-stay having at its end a socket 13, which fits around the king-bolt 14, interfits with the socket 10, and extends rearwardly, preferably forking, and being bolted to the perches at its forked portion. The flange 8 is made integral with perch-irons 15.

16 and 17 are the top and bottom circle-plates, respectively, which are connected together at their rear by a clip 18, and the top circle-plate is provided with projecting lugs or flanges 19, by which it is fixed to the perch-irons, the perch-irons for this purpose passing under and in proximity to the circle-plates. This construction greatly enhances the strength and durability of the device.

Instead of connecting the rear ends of the guard-stay 12 with the perches, as shown in the drawings, they may be connected with the upper fifth-wheel plate or with the perch-iron and fifth-wheel plate together.

The circle-plates 16 and 17 may, if desired, be made of complete circles or merely of segments of circles, since this does not form an essential part of my invention.

It will be seen by reference to the drawings that the axle-plate 4 and socket 10 are formed in a single piece, the plate 4 being secured to the axle by suitable clips or otherwise, the flange 9, which is integral with the plate 4 and with the king-bolt socket, being secured to the rear of the axle by means of bolts 20. The flange 8, which is integral with the socket 8' and perch-irons 15, is secured to the head-block by bolts 21. The front and rear flanges 4' and 9 of the axle-plate 4 afford a strong and substantial fastening means therefor and serve to protect the axle. In a similar way the flanges 5' and 8 protect the head-block and firmly clamp and secure in place the head-block and the sockets 8' and 11. The sockets 8', 11, 10, and 13 being all interfitted and thus secured together afford a very strong and substantial construction.

It will be seen that when constructed as above described the axle and axle-bed, the axle-plate 4, and socket 10 can be assembled and secured together independently of the other parts, and that the head-block 6, plate 5, and socket 11 can also be assembled separately. This is a point of practical advantage, because these parts when assembled can be stored away in the factory or warehouse in the least possible space. This advantage I secure by having the plate 5 and its socket 11 made separate from the socket 8' and its flange 8 and the perch-irons, the sockets 8' and 11 being adapted to be interfitted so as to afford the desired strength.

When the parts are to be assembled for use, the axle, with its attachments, the head-block and its attachments, and the perch-irons, with their attachments, are put together as shown in the drawings, and the king-bolt 14 is passed through the sockets 8', 11, and 10. The guard-stay 12 is then applied and a nut 22 is put on the end of the king-bolt.

By making the top fifth-wheel plate, its attachments, and the perch-irons in two pieces I economize in the cost, and by the construction which I have shown I secure all the advantages of neatness of appearance without sacrificing the strength which appertains to an integral construction of these parts.

I claim—

1. In fifth-wheels for vehicles, the combination of a king-bolt socket having a flange adapted to be fixed to the rear of the head-block and having a perch-iron integral therewith, a plate adapted to be fixed to the bottom of the head-block and having an integral king-bolt socket interfitting with the socket above named, a top axle-plate having a king-bolt socket interfitting with the socket of the head-block plate, and a guard-stay, said guard-stay being interfitted with the socket of the axle-plate; substantially as described.

2. A fifth-wheel for vehicles having a top axle-plate provided with a rearwardly-extending projection or socket, a bottom head-block plate also provided with a rearwardly-extending projection or socket and adapted to bear on the top of the first-mentioned projection or socket, and a perch-iron having connected therewith a plate or flange adapted to bear against the rear of the head-block and secured thereto and having also a bearing upon the upper surface of the rearwardly-extending projection or socket of the head-block plate, said perch-iron extending therefrom downwardly under the circle-plates and being fixed to the top circle-plate by means of a flange or flanges; substantially as described.

3. A fifth-wheel for vehicles having a perch-iron, a king-bolt socket and a flange adapted to bear against the rear of the head-block, formed integral with each other, a head-block plate adapted to fit on the under side of the head-block and having a king-bolt socket interfitting with the socket of the perch-iron, and a top axle-plate having a king-bolt socket which interfits with the socket of the head-block plate and provided with a flange arranged to bear against the front side of the axle; substantially as described.

In testimony whereof I have hereunto set my hand.

WILLIAM L. HAWES.

Witnesses:
JOHN McGRATH,
HENRY WOOST.